July 8, 1958 C. A. WOODCOCK ET AL 2,842,666

MULTIVIBRATOR

Filed Nov. 19, 1951

Inventors:
Charles A. Woodcock,
Kenneth O. Straney,
by Paul A. Frank
Their Attorney.

United States Patent Office 2,842,666

Patented July 8, 1958

2,842,666

MULTIVIBRATOR

Charles A. Woodcock, Nahant, and Kenneth O. Straney, Beverly, Mass., assignors to General Electric Company, a corporation of New York Application November 19, 1951, Serial No. 257,036

16 Claims. (Cl. 250—36)

Figure 1:
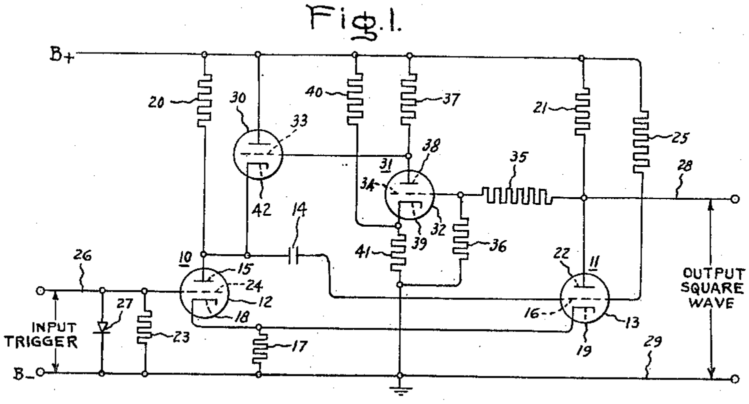
Figure 1:
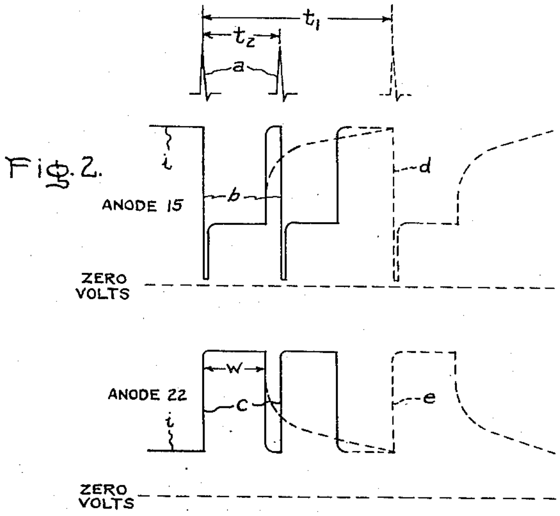
Figure 1:
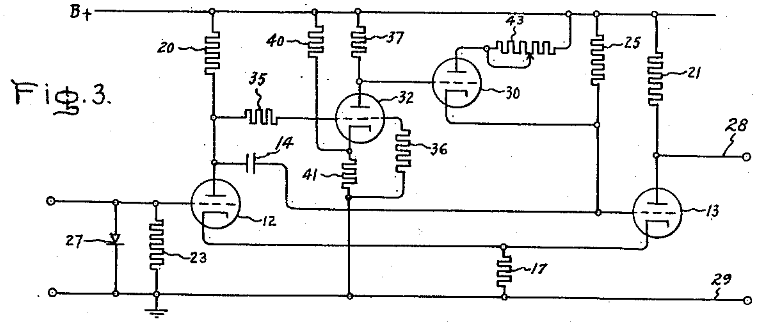

Our invention relates to multivibrators, and more particularly to multivibrators of the type having a pair of capacity-coupled amplifier stages and regenerative means producing rapid transition between two operational states.

Multivibrators are electric devices having dual-state operation corresponding to two different voltage level conditions in the device. They may have no stable operational states (free running type), have only one stable state (mono-stable or "flip-flop" type), or may have two stable states (bi-stable or "Eccles-Jordan" type). Those multivibrators having stable states of operation require an input electric pulse or "trigger" to initiate transition into at least one of its two operational states.

Most conventional multivibrators comprise two voltage amplification stages, usually employing electric discharge devices coupled together by a capacitor and including some means of voltage regeneration causing extremely rapid transition between the two stable or unstable states of operation. The term "capacity-coupled multivibrator" is herein employed to define multivibrators of this general type having two amplifier stages coupled together by a capacitor, and is not intended to connote the means by which regeneration is produced. Such regenerative means may, for example, be a common cathode biasing circuit for both amplifier stages or a capacitor-coupled feedback circuit.

The speed of dual-state transition in such capacity-coupled multivibrators is usually limited by the time required for the coupling capacitor to charge or discharge its voltage during the transition interval. The primary impedance component in the charge-varying conduction path of the coupling capacitor is normally a load resistor or a direct current return resistor whose magnitude is dictated by the desired degree of amplification to be derived from the amplifier stages of which these resistors are components. As a consequence, the capacitor charging or discharging time, customarily represented by a value called the "RC time constant," is normally a predetermined parameter of the multivibrator circuit, limiting both the speed of dual-state transition as well as the permissible rate of transition repetition.

The presence of a long time constant for charging or discharging the coupling capacitor not only limits the frequency of cyclic operation of such capacity-coupled multivibrators, but often produces an undesirable distortion of the output square wave form of the multivibrator.

A particularly annoying aspect of this problem exists in connection with apparatus which employs the average value (D. C. component) of uniform amplitude and duration (constant area) output pulses of a monostable multivibrator as a measure of the multivibrator triggering frequency or "repetition rate." If the monostable multivibrator is the capacity-coupled type, the capacitor charging time constant determines the "recovery time" of the multivibrator, in other words, the time required for the multivibrator to move from its unstable operational state back into a completely stable state. In order that the average value of the multivibrator output pulses linearly represent the triggering frequency, sufficient time must be allotted for complete recovery of the multivibrator before it can again be energized by an input trigger signal. As a result, the permissible repetition rate of energization for good linearity has heretofore been much less than that theoretically possible before overlap of the multivibrator output pulses occurs.

Accordingly, one object of the invention is to provide capacitively coupled multivibrators operable at high cyclic frequencies without a sacrifice in amplification.

Another object of the invention is to provide capacitively coupled multivibrators producing an output voltage having substantially undistorted square wave forms.

A further object of the invention is to provide a mono-stable capacity-coupled multivibrator capable of producing output pulses of uniform amplitude and predetermined duration whose average value accurately represents the repetition rate of energization of the multivibrator, even with repetition rates substantially as high as that theoretically possible.

In fulfillment of this latter object, it is a specific object of the invention to provide a mono-stable capacity-coupled multivibrator having extremely rapid transition from its unstable to stable operational state, i. e., a substantially instantaneous recovery time.

A still further specific object of the invention is to provide means for controlling either the capacitor charging or discharging time constant in capacity-coupled multivibrators without otherwise altering the operation or amplification of the multivibrator.

In general, the invention comprises a capacity-coupled multivibrator in which an electric discharge device is connected in a series conducting path of the coupling capacitor to form either a charging or discharging path, herein referred to as a "charge-varying" conduction path of the capacitor. The discharge device is biased in accord with the two voltage levels existing in the multivibrator in a manner such that the discharge device is rendered conductive during the corresponding charging or discharging period of the coupling capacitor. Conduction of the discharge device charges or discharges the capacitor substantially instantaneously. An impedance may be connected in series circuit relation with the capacitor and discharge device to provide a longer charging or discharging time, if necessary.

The novel features which we believe to be characteristic of our invention are set forth in the appended claims. The invention itself, however, together with further objects and advantages thereof may best be understood by reference to the following description taken in connection with the accompanying drawing in which Fig. 1 is a circuit diagram of a mono-stable multivibrator embodying the invention, Fig. 2 is a number of time-related wave shapes of voltages occurring at various points in the circuit of Fig. 1, and Fig. 3 is a circuit diagram of a mono-stable multivibrator similar to Fig. 1 but incorporating a modified form of the invention.

Referring to Fig. 1, the invention is shown in connection with a multivibrator comprising a pair of voltage amplifier stages indicated generally by numerals 10 and 11, associated with triode electric discharge devices 12 and 13 respectively. Amplifier stages 10 and 11 are coupled together by a capacitor 14 connected between an anode 15 of discharge device 12 and a control electrode 16 of discharge device 13. Voltage regeneration between the two amplifier stages 10 and 11 is provided by virtue of a cathode resistor 17 connected to both cathode 18 of device 12 and cathode 19 of device 13, and thus in common with both amplification stages 10 and 11. Load resistors 20 and 21 are connected between a source of positive potential, designated as B+, and anodes 15 and 22 respectively of discharge devices 12 and 13. A direct current return resistor 23 is connected between control electrode 24 of discharge device 12 and the grounded negative terminal B− of the potential source, and another direct current return resistor 25 is connected between control electrode 16 of discharge device 13 and the positive terminal B+ of the potential source. The components of Fig. 1 designated by numerals 12 through 25, connected as described above and illustrated by Fig. 1, constitute a conventional capacity-coupled mono-stable multivibrator of the type employing cathode bias regeneration. A positive-going electric pulse trigger signal may be supplied to control electrode 24 of discharge device 12 through an input conductor 26. A current rectifying element 27 is preferably connected in parallel with direct current resistor 23 in order to provide a low impedance path to the grounded negative terminal B− for negative-going excursions of the trigger signal. The output voltage pulse produced by the multivibrator is usually taken through output conductors 28 and 29 respectively connected to anode 22 of discharge device 13 and the grounded B− terminal of the potential source.

As mentioned above, one limitation upon the cyclic operational frequency of such mono-stable multivibrators is the time required for coupling capacitor 14 to become fully charged when the multivibrator is moving through the transition interval from its unstable into its stable state of operation. In accord with the invention, an electric discharge device 30, preferably of the triode type as shown, is connected in circuit relation with capacitor 14 and in shunt with resistor 20, the impedance component that normally constitutes the charging path for capacitor 14. The conduction of discharge device 30 reduces the charging time of capacitor 14 by providing a low impedance charging path in shunt with resistor 20.

In order to render discharge device 30 conductive only during the capacitor 14 charging period of the multivibrator operational cycle, means are provided for biasing the discharge device 30 in accord with the two voltage levels existing in the multivibrator during its dual-state operation. This biasing voltage is derived from a voltage point in the multivibrator circuit having a proper phase relation to the charging period of capacitor 14 to accomplish the desired result. In the multivibrator of Fig. 1, the different voltage levels existing at the anode 22 of discharge device 13 are a convenient source for deriving this biasing signal from the multivibrator. A direct current phase inverting amplification stage 31, associated with a discharge device 32, is connected between anode 22 of discharge device 13 and a control electrode 33 of discharge device 30 to deliver this biasing signal to discharge device 30 with the proper phase relation and amplitude.

Phase inverter stage 31 is shown as including an attenuating resistor 35 connected between control electrode 34 of discharge device 32 and anode 22 of discharge device 13. A direct current return resistor 36 is connected between control electrode 34 and ground, and a load resistor 37 is connected between anode 38 of discharge device 32 and the positive B+ terminal of the potential source. The discharge device 32 is biased by a connection from its cathode 39 to a voltage dividing network comprising resistor 40 and cathode resistor 41 connected between the B+ and B− terminals of the potential source. The magnitude of resistors 40 and 41 is such that the conduction of discharge device 32 is cut off when the voltage supplied to control electrode 34 from anode 22 is at its minimum voltage level, such as when the multivibrator resides in its stable state of operation. Discharge device 32 then becomes heavily conducting in a manner to be described hereinafter when the voltage at anode 22 changes to its maximum level, such as when the multivibrator moves into its unstable state of operation.

The operation and advantages of the invention may be understood by referring to the wave forms of Fig. 2 in which electric pulses "*a*" represent input triggering signals, square-wave pulses "*b*" represent the voltage on anode 15 of discharge device 12, while square-wave pulses "*c*" represent the voltage on anode 22 of discharge device 13. The wave shape designated by dashed line "*d*" represents the voltage that would be present on anode 15 but for the improvement of the invention, while the square-wave designated by dashed line "*e*" represents the voltage that would be present on anode 22 but for the improvement of the invention.

As mentioned above, mono-stable multivibrators are often employed to produce output voltage square-wave pulses of constant amplitude and duration in order that the average value of these square-wave pulses, i. e., the direct current component thereof, may be employed as a measure of the input triggering pulse repetition frequency. In Fig. 2 the distance $t_1$ represents the minimum pulse repetition time typically permissible for a given pulse width $w$ in conventional multivibrators beyond which the incomplete recovery of such conventional multivibrators prevents a linear relation between the repetition frequency and the direct current component of the output square waves. The distance $t_2$ represents the much shorter repetition time that is permissible for the same pulse width $w$ without sacrifice of linearity as a result of the improvement of the invention.

In the absence of a triggering signal, the apparatus of Fig. 1 resides in a stable state of operation. Discharge device 13 is conducting as a result of a positive potential supplied to the control electrode 16 through resistor 25. The conduction of discharge device 13 produces a large voltage drop across cathode resistor 17 which biases discharge device 12 beyond or near its conduction cut-off point. For best linearity and high permissive repetition rate, it is preferable that the bias voltage provided by resistor 17 be such that a slight amount of conduction occurs in discharge device 12. As indicated by the initial portion *i* of waves *b* and *c* of Fig. 2, anode 15 initially resides at a maximum voltage condition while anode 22 of discharge device 13 resides at a minimum voltage condition. Due to this minimum voltage delivered to control electrode 34 of discharge device 32 from anode 22, discharge device 32 is maintained in a non-conducting state by virtue of its cathode bias voltage resulting from the connection of cathode 39 to resistors 40 and 41. Anode 38 is thus at a maximum voltage condition essentially equal to the B+ potential, and control electrode 33 which is directly connected to anode 38 resides at this high potential. However, anode 15 of device 12 also resides at a maximum potential substantially equal to the B+ potential; and since cathode 42 of discharge device 30 is directly connected to anode 15, there is little or no potential difference between the cathode and control electrode of discharge device 30 and little or no conduction therethrough.

Upon the occurrence of a positive input trigger pulse, conduction in discharge device 12 increases, producing a drop in the voltage on anode 15, decreasing the voltage on control electrode 16 and the conduction of discharge device 13, which in turn reduces the bias voltage developed across resistor 17 and supplied to cathode 18 of discharge device 12. Discharge device 12 is thus rapidly driven to complete conduction and discharge device 13 driven beyond its conduction cut-off point. The multivibrator now reaches its unstable operational state in which anode 15 is at its minimum voltage level condition and anode 22 at its maximum voltage level condition. Discharge device 32 is rendered highly conductive during this unstable interval due to the high voltage supplied to its control electrode 34 from anode 22. The voltage on anode 38 of discharge device 32 is thus reduced to be essentially equal to the bias voltage on cathode 39, and discharge device 30 is maintained nonconducting by this low biasing voltage supplied to its control electrode 33 from anode 38 of discharge device 32. The bias voltage supplied cathode 39 from the voltage divider comprising resistors 40 and 41 is, of course, made considerably less than the minimum voltage on anode 15 of discharge device 12 when the discharge device is in the state of maximum conduction. The voltage on control electrode 33 is thus considerably less than the voltage on cathode 42 of the discharge device 30 to provide this conduction cut-off condition of discharge device 30 during this unstable operational state of the multivibrator.

The multivibrator remains in this unstable operational state until capacitor 14 discharges through resistor 25 a sufficient portion of its negative voltage to bring control electrode 16 into the conduction region of discharge device 13. As discharge device 13 begins to conduct, the bias voltage on discharge device 12 increases, decreasing conduction of discharge device 12 and increasing the voltage at anode 15 thereof. As the result of this regeneration, discharge device 13 is rapidly driven to its maximum conduction condition and discharge 12 driven to its cut-off or minimum conduction condition. The speed by which the multivibrator reverts back to this stable operational state is limited, however, by the speed with which capacitor 14 can become recharged to its initial highly charged condition. Without the improvement of the invention, the only charging path of capacitor 14 is load resistor 20 unless discharge device 12 is not completely cut-off in which case the impedance of the discharge device 12 is in parallel with the impedance of the load resistor 20 in determining the charging time constant. A typical resulting voltage wave on the anodes 15 and 22 is illustrated by voltage waves *d* and *e* of Fig. 2; the distortion away from a perfect square-wave resulting from the time required to recharge capacitor 14 through impedance 20. With the improvement of the invention, however, the drop in voltage occurring on anode 22 of discharge device 13 as the multivibrator begins to move from its unstable back into its stable state of operation causes discharge device 32 to be rendered non-conductive. The voltage on anode 38 thus immediately rises to be substantially equal to the B+ potential, and discharge device 30 conducts enabling capacitor 14 immediately to charge to the B+ potential through the low impedance of conducting discharge device 30 rather than through the high impedance of load resistor 20. Once capacitor 14 re-attains its charged condition, the voltage on anode 15 is also substantially equal to the B+ potential, and there is little or no voltage drop across discharge device 30 and no further conduction thereof.

As illustrated by Fig. 3, the invention may be employed to reduce the discharge time of capacitor 14 rather than the charging time by merely connecting discharge device 30 in shunt with direct current return resistor 25 instead of load resistor 20 and connecting the control electrode 34 to receive voltage through resistor 35 from anode 15 instead of anode 22. Discharge device 30 is then rendered conductive during the discharge period of capacitor 14; thus considerably reducing the duration of the unstable interval of the multivibrator.

A considerable range of control over the duration of this unstable interval may be secured by connecting a resistor 43, preferably of variable magnitude, in series with discharge device 30, as shown in Fig. 3. The discharge time constant of capacitor 14 will then be determined primarily by the impedance of resistor 43 in parallel with resistor 25. This circuit of Fig. 3 is particularly useful in the generation of extremely short pulses less than would be permitted by the minimum values of capacitor 14 and resistor 25.

Other free-running or bi-stable as well as mono-stable capacity-coupled multivibrators having other means of voltage regeneration may of course be substituted for the particular multivibrator illustrated in Figs. 1 and 3. For example, a multivibrator employing a capacitor connected between anode 22 and control electrode 24 for regeneration and seperate cathode resistors in place of the common cathode resistor 17 may alternatively be employed in conjunction with the invention. It is therefore to be understood that although we have shown particular embodiments of the invention, many other modifications may be made, and it is intended by the appended claims to cover all such modifications as fall within the true spirit and scope of the invention.

What we claim as new and desire to secure by Letters Patent of the United States is:

1. A multivibrator comprising a pair of voltage amplifier stages each simultaneously variable between two voltage level conditions of operation, a capacitor coupling said stages, one stage having an impedance component located in a charge-varying path of said capacitor, an electric discharge device connected in shunt with said impedance component, and means for biasing said discharge device responsive to the voltage levels existing in the other stage for rendering said discharge device conductive during the transition of said amplifier stages into one of their conditions of operation.

2. A multivibrator comprising a pair of voltage amplifier stages, a capacitor coupling said stages, said amplifier stages varying between two voltage level conditions of operation corresponding respectively to charging and discharging periods of said capacitor, one amplifier stage having an impedance component located in a charging path of said capacitor, an electric discharge device connected in shunt with said impedance component, and biasing means for said discharge device responsive to the voltage levels existing in the other amplifier stage for rendering said discharge device conductive only during the charging period of said capacitor.

3. A multivibrator comprising a pair of voltage amplifier stages, a capacitor coupling said stages, said amplifier stages varying between two voltage level conditions of operation corresponding respectively to charging and discharging periods of said capacitor, one amplifier stage having an impedance component located in a discharging path of said capacitor, an electric discharge device connected in shunt with said impedance component, and biasing means for said discharge device responsive to the voltage levels existing in the other amplifier stage for rendering said discharge device conductive only during the discharging period of said capacitor.

4. A multivibrator comprising a pair of voltage amplifier stages, a capacitor coupling said stages, said amplifier stages each having two voltage level conditions of operation and being variable between said two conditions during a transition interval corresponding to a charging period of said capacitor, one amplifier stage having a resistor located in the charging path of said capacitor, an electric discharge device connected in shunt with said resistor, and biasing means for said discharge device responsive to the voltage levels existing in said other amplifier stage for rendering said discharge device conductive during said transition interval.

5. A multivibrator comprising a pair of voltage amplifier stages, each simultaneously variable between two different voltage level conditions of operation, a capacitor coupling said stages, one stage having an impedance component located in a charging path of said capacitor, an electric discharge device connected in shunt with said impedance component, and biasing means for said discharge device including a phase inverter responsive to the voltage levels existing in the other amplifier stage for rendering said discharge device conductive only during a transition interval of the said amplifier stages into a predetermined one of their conditions of operation, said transition interval corresponding to the charging period of said capacitor.

6. A multivibrator comprising a pair of voltage amplifier stages each including an electric discharge device having an anode and having two different anode voltage level conditions of operation corresponding to conduction and non-conduction of the discharge device, a capacitor coupling said stages, an impedance connected in one of said stages in a charge-varying conduction path of said capacitor, a third electric discharge device connected in shunt with said impedance, and a phase inverter stage including a fourth electric discharge device connected to bias said third discharge device to conduct when said fourth discharge device is non-conducting, and biasing means for said fourth discharge device responsive to the anode voltage of the other of said amplifier stages for rendering said fourth discharge device non-conducting when the discharge device of said other amplifier stage is conducting.

7. In combination, a multivibrator of the capacity-coupled type variable between two different voltage level conditions of operation, an electric discharge device connected in series circuit relation with the coupling capacitor to form a series conducting path for varying the charge on said capacitor, and means for biasing said discharge device responsive to the voltage levels existing in the multivibrator to render said discharge device conductive when the multivibrator transfers into one of its voltage level operational conditions.

8. In combination, a multivibrator of the capacity-coupled type variable between two different voltage level conditions of operation, an electric discharge device and a resistor connected in series circuit relation with the coupling capacitor to form a series conducting path for varying the charge on said capacitor, and means for biasing said discharge device responsive to the voltage levels existing in the multivibrator to render said discharge device conductive when the multivibrator transfers into one of its voltage level operational conditions.

9. In combination, a multivibrator of the type having a pair of capacity-coupled amplifier stages each simultaneously variable between two different voltage level conditions of operation, an electric discharge device connected in a charge-varying conduction path of the interstage coupling capacitor, and biasing means for said discharge device responsive to the two voltage levels existing in one of the amplifier stages for rendering said discharge device conductive only during the transition of said amplifier stages into one of their conditions of operation.

10. In combination, a capacity coupled mono-stable multivibrator having a first stable voltage level operational condition and a second unstable voltage level operational condition and having an impedance component through which the coupling capacitor charges during the transition of the multivibrator from its unstable to its stable operational condition, an electric discharge device connected in shunt with said impedance component, and means for biasing said discharge device in response to the voltage levels existing in the multivibrator for rendering said discharge device conductive only during the charging period of said capacitor.

11. In combination, a capacity coupled mono-stable multivibrator having a first stable voltage level operational condition and a second unstable voltage level operational condition and having an impedance component through which the coupling capacitor discharges during said unstable operational condition, an electric discharge device connected in shunt with said impedance component, and means for biasing said discharge device in response to the voltage levels existing in the multivibrator for rendering said discharge device conductive only during the discharging period of said capacitor.

12. In combination, a capacity coupled mono-stable multivibrator having a first stable voltage level operational condition and a second unstable voltage level operational condition and having an impedance component through which the coupling capacitor discharges during said unstable operational condition, an electric discharge device and a resistor connected in series with each other and in shunt with said impedance component, and means for biasing said discharge device in response to the voltage levels existing in the multivibrator for rendering said discharge device conductive only during the discharging period of said capacitor.

13. A multivibrator comprising a pair of voltage amplifier stages each including an electric discharge device having an anode and having two different anode voltage level conditions of operation corresponding to the conduction and non-conduction of the discharge device, a capacitor coupling said stages, an impedance connected in the first of said stages in a charge-varying conduction path of said capacitor, a third electric discharge device connected in series circuit relation with the coupling capacitor to form a series conducting path for varying the charge upon said capacitor, means for biasing said third discharge device in response to the anode voltage levels existing in the multivibrator to render said third discharge device conductive when said multivibrator transfers into one of its voltage level operating conditions and means for applying a driving impulse solely to the first of said stages.

14. A multivibrator as recited in claim 13, including means to render negative excursions of the driving impulse applied to the first of said stages ineffective to change the voltage levels of said multivibrator.

15. A multivibrator including a pair of grid controlled discharge devices each having operating potential applied to its anode through a separate resistor and having two different anode voltage level conditions of operation, the second of said discharge devices having its grid coupled to the anode of the first of said discharge devices through a capacitor, a third electric discharge device connected in series circuit relation with the coupling capacitor to form a series conducting path for varying the charge on the capacitor, means for biasing said third discharge device in response to the anode voltage levels of said second discharge device to render said discharge device conductive when the second discharge device transfers into one of its anode voltage level operational conditions, and means for applying a driving impulse solely to the grid of the first of said discharge devices whereby its anode voltage level condition is changed.

16. A multivibrator including a pair of grid controlled discharge devices each having operating potential applied to its anode through a separate resistor and having two different anode voltage level conditions of operation, the second of said discharge devices having its grid coupled to the anode of the first of said discharge devices through a capacitor, a third electric discharge device connected in series circuit relation with the coupling capacitor to form a series conducting path for varying the charge on the capacitor, means for biasing said third discharge device in response to the anode voltage levels of said second discharge device to render said discharge device conductive when the second discharge device transfers into one of its anode voltage level operational conditions, means for applying a driving impulse to the grid of the first of said discharge devices whereby its anode voltage level condition is changed, and means to render negative excursions of the driving impulse ineffective to change the voltage level operational conditions of the multivibrator.

References Cited in the file of this patent

UNITED STATES PATENTS

| | | |
|---|---|---|
| 2,405,843 | Moe | Aug. 13, 1946 |
| 2,530,033 | Scoles | Nov. 14, 1950 |
| 2,550,116 | Grosdoff | Apr. 24, 1951 |